Figure 1:
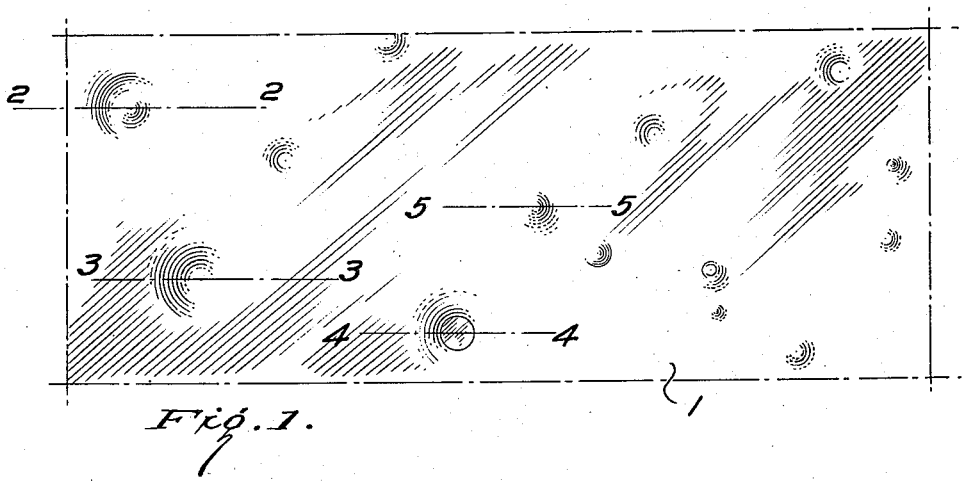

Dec. 25, 1951 F. R. SPENCER 2,579,980
BENZOGUANAMINE RESIN SURFACE COATING MATERIALS AND
PROCESSES FOR PREPARING THE SAME
Filed Jan. 21, 1950

INVENTOR
FRANK R. SPENCER,
BY
James T. Dunn
ATTORNEY

Patented Dec. 25, 1951

2,579,980

UNITED STATES PATENT OFFICE 2,579,980

BENZOGUANAMINE RESIN SURFACE COATING MATERIALS AND PROCESSES FOR PREPARING THE SAME

Frank R. Spencer, Stamford, Conn., assignor to American Cyanamid Company, New York, N. Y., a corporation of Maine Application January 21, 1950, Serial No. 139,805

3 Claims. (Cl. 260—45.3)

This invention relates to compositions of matter comprising benzoguanamine-aldehyde resins, an alkyd resin and a small amount of a modifying polymer of an aliphatic ester of an alpha, beta unsaturated carboxylic acid. This invention further relates to compositions of matter comprising homogeneous blends of from 5-95 parts of a benzoguanamine-aldehyde resin, from 95-5 parts of an alkyd resin and from 0.05 to 5.0% by weight of a polymeric aliphatic ester of an alpha, beta unsaturated carboxylic acid. This invention further relates to compositions of matter comprising compatible blends of from 20-40 parts of a benzoguanamine-aldehyde resin and from 80-60 parts of an alkyd resin and from 0.05 to 10.0% of polymeric aliphatic ester of an alpha, beta unsaturated carboxylic acid. Additionally, this invention relates to coating compositions which are capable of yielding on baking a non-crawling film comprising compatible blends of a benzoguanamine-aldehyde resin, an alkyd resin and a modifier such as polybutyl acrylate or polybutyl fumarate and a solvent.

One of the objects of the instant invention is to produce a coating composition which is capable of producing on baking a non-crawling film. A further object of the instant invention is to produce a coating composition with improved alkali resistance while still avoiding the defect of cratering or crawling, by incorporating into a compatible blend of benzoguanamine-aldehyde resin, alkyd resin, and a small portion of polymeric aliphatic ester of an alpha, beta unsaturated carboxylic acid. Other objects of the instant invention will be set forth hereinbelow in greater detail.

In the preparation of these compositions, the alkyd resin utilized may be one which is oil free or it may be what is commonly referred to as a short oil modified alkyd resin, namely, one containing not more than 25% oil based on the total weight of the alkyd resin; a medium oil alkyd which is defined as an alkyd resin which has been modified by 26% to 50%, or a long oil alkyd which is generally defined as an alkyd resin which is modified by 51-80% of oil. The alkyd resins which may be used in the practice of the process of the instant invention are those which are conventionally prepared by use of a polycarboxylic acid and a polyhydric alcohol in which the acid may be a saturated acid or an alpha, beta unsaturated acid but preferably those which are saturated. The benzoguanamine-aldehyde resins utilizable in the preparation of the compositions of the instant invention may be prepared by reacting benzoguanamine with an aldehyde such as formaldehyde, acetaldehyde, benzaldehyde, furfural and the like. The mol ratio of the benzoguanamine to aldehyde may be varied over a fairly wide range such as mol ratios of 1:0.5 to 1:14, respectively, but preferably those which have mol ratios of 1:1 to 1:4, respectively. For optimum results, one should use mol ratios of 1:2-1:3, respectively.

The benzoguanamine resins per se have many desirable features for use in coating compositions but at the same time have other characteristics which make them undesirable for use alone as coating compositions. As advantages, the benzoguanamine resins produce films which are hard, glossy, and alkali resistant whereas the disadvantages primarily are in the brittleness of the films and tendency of the films to "crawl" or "crater." When the benzoguanamine resins are modified by the addition of varying amounts of alkyd resins, the desirable characteristics of the benzoguanamine resins are retained while some of the undesirable characteristics are eliminated. The defect of cratering, however, still tends to persist, particularly when the amount of benzoguanamine resin present in the mixture is greater than 20% by weight. The applicant has discovered that these resinous mixtures can be modified by the addition of polymeric aliphatic esters of alpha, beta carboxylic acid, so that they display no cratering whatever when used as surface coating compositions. This cratering defect is not solely limited to surface coating compositions but is to be found in molded products and in other applications in which the resinous material has an exposed surface area.

Figure 2:
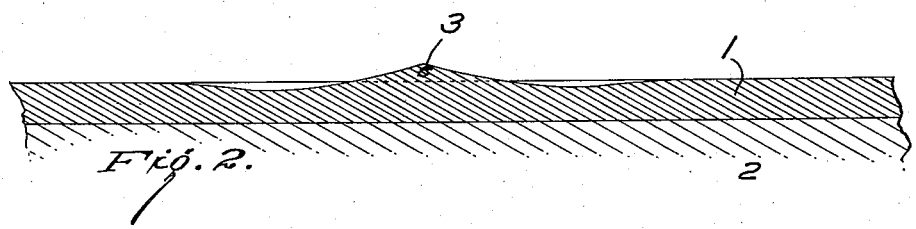
Figure 3:
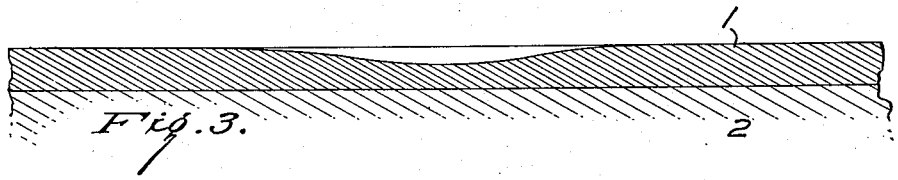
Figure 4:
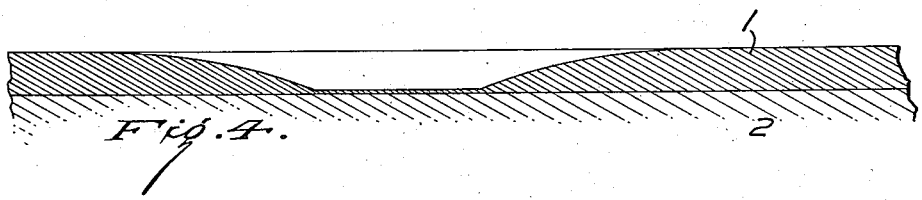
Figure 5:
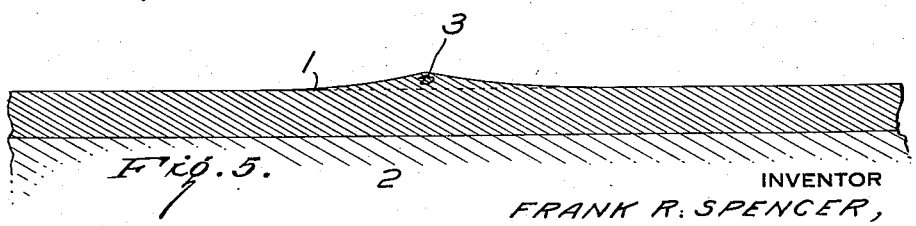

In the drawing, there are shown various types of cratering, crawling, and pin-holing defects, which are to be found when the benzoguanamine-alkyd resin mixture is used as a surface coating material, without the use of the anti-cratering materials which I have found to be capable of eliminating these defects. Fig. 1 is a top plan view of a coated surface showing various crater-like defects. Fig. 2 is an enlarged scale cross sectional view of the line 2, 2 of Figure 1 showing a typical crater-like depression due to the presence of a piece of lint, dust, or other foreign body on the surface of the substratum or in the film forming material at the time of the application of the surface coating material. Sometimes these foreign bodies attach themselves to the films after they have been applied and cause protuberances. Fig. 2 shows how the surface coating material can build up into a protuberance extending above the average plane surface of the coating material with depression below and each side of said protuberance. It will be readily seen that these depressions are emphasized when reflected light emitting from the curved surfaces of the depressions meets the eye. Fig. 3 shows an enlarged scale cross-sectional view of the line 3, 3 of Fig. 1 showing a slight depression in the surface of the coating material. Reflected light emphasizes the size of a crater of this type and makes it an undesirable and very noticeable defect. Fig. 4 shows an enlarged scale cross sectional view of the line 4, 4 of Figure 1 showing an aggravated crater-like depression in the surface coating material wherein the lowermost part of the crater shows an extremely thin film of coating material superimposed on the substratum base. Again in this instance reflected light emphasizes the dimensions of the crater and detracts considerably from the appearance of the film generally. Fig. 5 shows an enlarged scale cross sectional view of the line 5, 5 of Figure 1 showing a protuberance caused by the presence of a piece of lint, dust, or other foreign body on the surface of the base material or in the surface coating material at the time of the application of the coating material. In contradistinction with Fig. 2, it will be noted that the type of defect shown in Fig. 5 causes a protuberance in the surface coating material but does not cause the depressions on each side of the protuberance as was the case in Fig. 2. In the Figs. 2, 3, 4 and 5, the reference numeral 1 represents the surface coating material; 2 represents the base to which the surface coating material is applied. In the Figs. 2 and 5, the number 3 represents a foreign body such as a piece of lint, dust, or the like. These unsightly crater-like depressions, shown in Figs. 2, 3, and 4, can be completely eliminated or very substantially diminished by incorporating into the surface coating materials of the present invention small amounts of a polymeric aliphatic ester of an alpha, beta unsaturated carboxylic acid. The effect, for example, would be to change the defect from that shown in Fig. 2 to that shown in Fig. 5. The defect shown in Fig. 2 is not readily correctable by ordinary surface treating means such as by sanding or polishing or both. In contradistinction, however, the defect as shown in Fig. 5 is readily correctable by ordinary surface treating means.

In the preparation of the alkyd resin, one may modify the resin by use of oils or oil acids of the drying, semi-drying, or non-drying classes although it is actually preferred that the semi-drying or non-drying oil be used. There is little overall advantage to be derived in using exclusively the drying oils although they may be used where, for example, color retention on baking is not as important as adhesion. If the amount of oil used to modify the alkyd resin decreases, particularly when the range of proportions comes within the limits of those set forth above and defined as short oil alkyd resins, the necessity for the use of a stronger solvent for the resin to form a coating composition becomes more pronounced.

In the preparation of these alkyd resins, one may use the saturated polycarboxylic acids or the unsaturated polycarboxylic acids. Amongst those saturated polycarboxylic acids which may be used in the practice of the process of this invention are oxalic, malonic, succinic, glutaric, sebacic, adipic, pimelic, suberic, azelais, tricarballyic, citric, tartaric, and maleic. Phthalic acid and terephthalic acid may also be used in the preparation of the alkyd resins in the same proportions as the saturated polycarboxylic acids. Additionally, one may use such unsaturated acids as maleic, fumaric, itaconic, citraconic and the like. These acids and other comparable acids, their esters and their anhydrides may be used in the preparation of these alkyd resins. Obviously, these acids may be used either singly or in combination with one another.

In the preparation of the alkyd resin, the conventional polyhydric alcohols may be used such as ethylene glycol, diethylene glycol, dimethylene glycol, tetramethylene glycol, pinacol, trimethylol propane, trimethylol ethane, mannitol, dulcitol, sorbitol, glycerol, pentaerythritol, dipentaerythritol, and the like. The polyhydric alcohols may be used either singly or in combination with one another in the esterification reaction in the preparation of the alkyd resin.

In the esterification reaction between the polycarboxylic acid and the polyhydric alcohol in the formation of the alkyd resin, it is possible to use a polyhydric alcohol in equimolecular proportions with a polycarboxylic acid. There are instances, however, in which it is desired to use as much as 50% in excess of the amount of polyhydric alcohol of that theoretically required to esterify completely the polycarboxylic acid. The excess of alcohol in the reaction mixture is desirable in order to produce, in a reasonably short time, a comparatively low acid number in the esterification product.

In the preparation of the oil modified alkyds to be used in the instant invention, one may use such oils as castor oil, linseed oil, chaulmoogra oil, cherry kernel oil, corn oil, hemp seed oil, grape seed oil, hazel nut oil, candlenut oil, lard oil, soya oil, coconut oil, cottonseed oil, olive oil, peach kernel oil, peanut oil, pistachio nut oil, rape seed oil, and the like. It has been set forth hereinabove that the use of the polymeric aliphatic esters of alpha, beta unsaturated carboxylic acids in modifying these resinous compositions is particularly useful when the oil modifier is a non-drying or a semi-drying oil or the acids derived therefrom. In order that the instant invention may be completely understood, the following examples are set forth hereinbelow. These examples are by way of illustration only and are not to be interpreted as limitations on the case except as indicated by the appended claims. All parts are parts by weight.

Resin A 115 parts of glycerin, 185 parts of phthalic acid anhydride, and 60 parts of dehydrated castor oil acids are introduced into a suitable reaction chamber and are heated to about 350° F. in a 3 hour period and gradually heated to 400° F. in about 1–1½ hour period. The batch is then held at this temperature until an acid number of 40 or less is obtained, after which time the batch is cooled to about 275°–300° F. The batch may then be diluted with a suitable solvent such as Cellosolve to a 50% solids solution.

Resin B 148 parts by weight of phthalic acid anhydride, 100 parts of glycerin, and 150 parts of soya oil, fatty acids are introduced into a suitable reaction chamber and there heated gradually to about 425° F. in a 3 hour period and the mixture is held at this temperature until an acid number of about 10-20 is reached. A solvent, such as toluene is then added in a sufficient amount to adjust the solids content to about 50% and the solution is then agitated at about 200° F. until it has become completely clear.

The following example is given to illustrate a conventional method of preparation of the benzoguanamine aldehyde resins. Specific enumeration of detail is given by way of illustration only and various modifications known to those skilled in the art may be incorporated into the process. All parts are parts by weight.

Resin C 1554 parts of a 37% aqueous formaldehyde solution with the pH adjusted to about 8 with sodium hydroxide is introduced into a suitable reaction chamber, thereafter 654 parts of benzoguanamine, 3 parts of magnesium carbonate, 945 parts of n-butanol, and 122 parts of benzene are introduced and the reaction mixture is heated under reflux decantation until 700 parts of water are drawn off. 7 parts of phthalic acid are then added and the heating under decantation is continued until practically all of the water (1250-1300 parts) has been removed. The reaction mass is then cooled to about 70-80° C. and then filtered. The yield is about 1950 parts of resin in solution containing 61-63% solids.

Blends of the benzoguanamine-formaldehyde resin solutions such as those prepared according to example in Resin C hereinabove with the oil modified alkyds of Resins A or B or the oil free alkyds may be accomplished on a basis of 20 to 60 parts of benzoguanamine resins to about 80 to 40 parts of alkyd in the formulation of baking enamels. As an example of a baking enamel, the following composition is set forth.

Enamel

| | Parts |
|---|---|
| Resin A (50% solids solution) | 130 |
| Resin C (60% solids solution) | 70 |
| Pigment (toluidine red) | 25 |
| Solvent | 60 |

The pigment is preferably ground into a part of the alkyd resin solution in a roller or ball mill. To this composition is added the remaining alkyd and benzoguanamine resin and about 1 part of polybutyl acrylate and the entire mixture is completely stirred until a homogeneous compatible mixture is obtained. The coating composition is then applied to bare sheet steel or bonderized steel or over a priming coat. When baked for a period of ½ hour to 1 hour at temperatures between about 225° F. to 350° F., a smooth hard glossy film which displays no cratering or crawling is produced. (Shorter bakes 5-15 minutes can be used at temperatures of 400-450° F.) Pigment may be ground in resin in pebble mill, roller mill, or ball mill depending on the particular pigment selected.

As modifiers for the alkyd resins in the preparation of these coating resins, it is possible to add in addition to the benzoguanamine-aldehyde compositions other resinous materials such as urea-aldehyde condensation products having mol ratios from 1:1 to 1:4 or melamine-aldehyde resins having mol ratios of 1:1-1:6. In the preparation of the additives, i. e., materials to be added to the alkyd resins, it is actually preferred that the benzoguanamine resins be alkylated with primary aliphatic alcohols having not more than 12 carbon atoms. It is preferred for optimum results to use the butylated benzoguanamine-formaldehyde resins in the preparation of surface coating materials. The reason for this is to maintain the most desirable hydrocarbon tolerance of the resinous mixture in solvent.

In the preparation of these coating compositions, it is conventional to use an organic solvent for the resin mixture. Among the solvents which may be used are acetone, butyl acetate, butyl carbitol, isobutyl ketone, dioxane, ethylene glycol, ethyl lactate, ethyl acrylate, ethyl acetate, isophorone, methyl-ethyl ketone, methyl isobutyl ketone, styrene, tetrachloroethylene, xylene and other aliphatic hydrocarbon solvents, and the like. The amount of solvent which may be used can be varied considerably from no solvent up to about 200% solvent based on the total weight of the resin solids.

As pigments one may use a great variety of pigments depending on the particular coloration desired and in the use and preparation thereof, one may utilize pigments in conventional amounts varying from no pigment for clear varnishes and lacquers up to 200% by weight of pigment based on the total weight of the resin as an approximate maximum. Amongst pigments that may be used are white lead, zinc oxide, titanium dioxide, lithopone, antimony oxide, Prussian blue, carbon black, chrome yellow, chrome orange, and the like.

Amongst the materials to which these coating compositions may be applied are such substrata metals as aluminum, zinc, tin, iron, bonderized steel, copper, nickel chromium, lead and chromadized Dow metal. They are additionally applicable to wood, glass and the like.

The polybutyl acrylate used in the composition of the instant invention may be readily prepared according to the following process:

Modifier A

About 160 parts of a suitable solvent, such as benzene, are introduced into a suitable reaction chamber and are heated until temperature of about 90 to 100° C. is reached. 0.5% of benzoyl peroxide admixed into 240 parts of the monomeric ester, butyl acrylate, is then introduced into the heated solvent dropwise, and the mixture is continuously heated under slight reflux. After the monomer has been completely added to the solvent, the reaction mixture is heated for a two hour period until the temperature becomes comparatively steady. Solids determinations may be made at regular intervals and when the total solids content is within the range of 50% to 70% the heating can be discontinued. This polymer may be then further diluted to low concentrations such as concentrations of 10% to 20% solids or less as desired by the addition of more solvent. The polybutyl acrylate solution thus prepared is ready for use in the composition of the instant invention.

In order to prepare the polybutyl fumarate, a method of preparation comparable to that used for the polybutyl acrylate can be adopted.

Modifier B

The monomeric dibutyl fumarate is introduced into a suitable reaction chamber with a small amount of benzoyl peroxide and is heated until a temperature of 80° to 100° C. is reached. This heating is continued at that temperature range until the viscosity becomes substantially constant. This heating will require from 6 to 10 hours. It is not necessary, however, in the preparation of the polybutyl fumarate to utilize a solvent although if one desires to do so it is possible to accomplish this fact. Instead of the benzoyl peroxide catalyst, it is possible to substitute a great variety of other catalysts which are well known to those skilled in the art. For instance, one may utilize ditertiary butyl peroxide, which is a high temperature catalyst, and in the use of such a catalyst, one may heat the fumarate from 130 to 160° C. until the viscosity becomes constant and this requires a time interval of between 6 and 10 hours.

*Modifier C*

A quantity of dipropyl fumarate is introduced into a suitable reaction chamber with a small amount (0.5% by weight) of benzoyl peroxide and the charge is heated until a temperature of 80° C.–100° C is reached. The heating is continued at that temperature range until the viscosity becomes substantially constant. This generally required heating for from 6 to 10 hours. The resultant polymer may be diluted to any desired solids concentration with as suitable organic solvent.

The modifiers which may be used in the practice of the process of this invention to prevent the occurrence of cratering in coating compositions comprising alkyd resins in admixture with benzoguanamine resins are the polymers of the aliphatic esters of alpha, beta unsaturated carboxylic acids. The alpha, beta unsaturated carboxylic acids which may be used in the preparation of the esters may be either monocarboxylic acids or polycarboxylic acids but it is necessary that the unsaturation in these acids be between the alpha, beta carbon atoms. To prepare the esters, one may use such acids as acrylic, crotonic, isocrotonic, methyl acrylic, fumaric, maleic, glutaconic, citraconic, itaconic, and the like. As alcohols to be used to form the esters prior to polymerization, one may use methyl, ethyl, propyl, isopropyl, butyl, isobutyl, amyl, hexyl, allyl, β allyl-ethyl, cetyl, ceryl, oleyl and the like. The method of preparing the polymers of these esters has been set forth hereinabove with respect to the polybutyl acrylate polypropyl fumarate and polybutyl fumarate and the preparation of the other polymers may be accomplished by a comparable procedure. One may use any polymer up to and including those whose polymerization has been permitted to continue until they reach a stage just short of incompatibility with the resinous mixture dissolved in solvent. Any slight incompatibility between the high molecular weight polymer of the lower alkyl esters of the alpha, beta unsaturated carboxylic acids and the resinous solution is of no appreciable consequence; actually these high molecular weight polymers may be utilized throughout the range of increasing incompatibility and up to that point wherein complete incompatibility is reached between the polymers of the alpha, beta acid esters and the resinous solutions. Mixtures of the polymers with each other and with the monomer may be utilized. Although the ethyl, propyl, amyl, and higher alkyl esters produce a decided improvement in inhibiting cratering in these resinous coating compositions, the butyl esters actually produce optimum results particularly the polybutyl esters of acrylic and fumaric acids. These latter two, polybutyl acrylate and polybutyl fumarate, have produced optimum results in the elimination of cratering in these enamel coating compositions. The amount of these polymers of the lower alkyl esters of alpha, beta unsaturated carboxylic acids which may be used to modify the benzoguanamine resin alkyd resin mixture may be varied over a fairly wide range such as 0.05% to 10% by weight of the polymer based on the total weight of the resin solids. When using the lower molecular weight polymers, it is desirable to use 5%–10% of the polymer, whereas in the use of the high molecular weight polymers, it is possible to use very small amounts such as 0.05%–1.0% in order to avoid the tendency of the enamels to crater. It is actually preferred that one use between 0.1% and 5% of the polymers with 0.5% of a fairly high molecular weight polymer producing optimum results. In the use of the polybutyl acrylate as a modifier 0.5% of the polymer having a molecular weight of 3000 to 7500 produces excellent results.

In order to present a representative picture of the relative merits of coating compositions prepared in keeping with the applicant's discovery, namely, those modified with a polymer of an aliphatic ester of an alpha, beta carboxylic acid compared with those coating compositions containing no added polymer, the following procedure was established.

An enamel of the following composition may be prepared. All parts are parts by weight:

| | Parts |
|---|---|
| Titanox (pigment) | 45 |
| Resin A (50% solids) | 60 |
| Resin C (60% solids) | 50 |

The pigment is ground into part of the alkyd in the conventional manner and subsequently reduced with the remaining alkyd and the benzoguanamine resin. The mixture is then further reduced by the addition of solvent until the enamel viscosity is approximately 24 seconds when measured with a #4 Ford cup. A film of this enamel is drawn down on a clean glass plate with a 1.5 mil Bird Applicator, air dried for 15 minutes, and then baked 20 minutes at 300° F. Examination of the film reveals the presence of many craters and thin spots in the film. A duplicate enamel modified with 0.5% by weight of polybutyl acrylate, based on the total resin solids, is prepared. A film is drawn down in the same manner set forth above and the film shows no craters or thin spots. Comparable enamels were prepared in which the polymeric additives set forth below were substituted in the place of the polybutyl acrylate and their comparative effectiveness as cratering inhibitors is set forth opposite each polymer on a percentage basis wherein the percentage set forth represents the number of craters eliminated compared to the number of craters appearing in the unmodified enamel film.

| | Per cent |
|---|---|
| Polyoleyl fumarate | 54 |
| Polyoctyl acrylate | 78 |
| Polymethyl isobutyl carbinyl acrylate | 87 |
| Isobutylene-dibutyl fumarate copolymer | 69 |
| Dibutyl fumarate ethyl acrylate copolymer | 62 |
| Polypropyl fumarate | 61 |
| Polybutyl fumarate | 95 |

I claim:

1. A coating composition, capable of yielding on baking a non-crawling film comprising a compatible blend of 20–40 parts of a benzoguanamine aldehyde resin, about 80–60 parts of an alkyd resin, about 0.5% by weight of a modifier comprising a polymeric alkyl ester of an alpha, beta unsaturated carboxylic acid, wherein said percentage by weight is based on the total weight of the resin solids and a solvent.

2. A coating composition, capable of yielding on baking a non-crawling film comprising a compatible blend of 20-40 parts of a benzoguanamine-formaldehyde resin, about 80-60 parts of an alkyd resin, about 0.5% by weight of a modifier comprising a polymeric alkyl ester of an alpha, beta unsaturated carboxylic acid and a solvent, wherein said percentage by weight is based on the total weight of resin solids.

3. A coating composition, capable of yielding on baking a non-crawling film comprising a compatible blend of 20-40 parts of a benzoguanamine-formaldehyde resin, about 80-60 parts of an alkyd resin, about 0.5% by weight of polybutyl fumarate and a solvent, wherein said percentage by weight is based on the total weight of the resin solids.

FRANK R. SPENCER.

REFERENCES CITED

The following references are of record in the file of this patent:

UNITED STATES PATENTS

| Number | Name | Date |
|---|---|---|
| 2,218,474 | Moore | Oct. 15, 1940 |

FOREIGN PATENTS

| Number | Country | Date |
|---|---|---|
| 871,893 | France | May 20, 1942 |